United States Patent
Heng et al.

(10) Patent No.: US 8,522,173 B2
(45) Date of Patent: Aug. 27, 2013

(54) SPATIAL CORRELATION-BASED ESTIMATION OF YIELD OF INTEGRATED CIRCUITS

(75) Inventors: Fook-Luen Heng, Yorktown Heights, NY (US); Alexey Y. Lvov, Congers, NY (US); Amith Singhee, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/590,300

(22) Filed: Aug. 21, 2012

(65) Prior Publication Data
US 2012/0311510 A1     Dec. 6, 2012

Related U.S. Application Data

(62) Division of application No. 12/718,567, filed on Mar. 5, 2010, now Pat. No. 8,276,102.

(51) Int. Cl.
*G06F 17/50*     (2006.01)

(52) U.S. Cl.
USPC ............................................. 716/56

(58) Field of Classification Search
USPC ............................................. 716/56
See application file for complete search history.

(56) References Cited

U.S. PATENT DOCUMENTS

| | | | |
|---|---|---|---|
| 5,754,432 A | 5/1998 | Komatsuzaki et al. | |
| 6,178,539 B1 | 1/2001 | Papadopoulou et al. | |
| 6,210,983 B1 | 4/2001 | Atchison et al. | |
| 6,308,304 B1 | 10/2001 | Devgan et al. | |
| 6,553,559 B2 * | 4/2003 | Liebmann et al. | 716/53 |
| 6,901,564 B2 | 5/2005 | Stine et al. | |
| 6,947,806 B2 | 9/2005 | Wang | |
| 7,143,371 B2 | 11/2006 | Allen et al. | |
| 7,260,444 B2 | 8/2007 | Chen et al. | |
| 7,260,790 B2 | 8/2007 | Allen et al. | |
| 7,386,418 B2 | 6/2008 | Lin et al. | |
| 7,503,020 B2 | 3/2009 | Allen et al. | |
| 7,512,921 B2 | 3/2009 | Shibuya | |
| 7,747,978 B2 * | 6/2010 | Ye et al. | 716/50 |

(Continued)

OTHER PUBLICATIONS

E. Papadopoulou, "Critical area computation via Voronoi diagrams," IEEE Transactions on Computer Aided Design of Integrated Circuits and Systems, V 18 N4, p. 463-474 (1999).

(Continued)

*Primary Examiner* — Jack Chiang
*Assistant Examiner* — Brandon Bowers
(74) *Attorney, Agent, or Firm* — Preston Young; Michael J. Chang, LLC

(57) ABSTRACT

A method for estimating yield of a wafer having a plurality of chips printed thereon is provided which includes the following steps. The chip design is divided into a plurality of rectangular cells. A process window is determined for each of the cells. The focus and dose values on the wafer are measured and used to determine a Gaussian random component of the focus and dose values. The focus and dose values on the wafer are represented as a sum of a systematic component of the focus and dose values and the Gaussian random component. Wafer yield is estimated based on a number of the chips for which at each point (x, y) the focus and dose values, as represented as the sum of the systematic component of the focus and dose values and the Gaussian random component, belong to a corresponding one of the process windows.

6 Claims, 10 Drawing Sheets

(56) References Cited

U.S. PATENT DOCUMENTS

| | | | |
|---|---|---|---|
| 8,230,371 B2 * | 7/2012 | Borjon | 716/55 |
| 8,250,498 B2 * | 8/2012 | Huang et al. | 716/55 |
| 2005/0055121 A1 | 3/2005 | Wang | |
| 2006/0150130 A1 | 7/2006 | Allen et al. | |
| 2006/0190224 A1 | 8/2006 | Allen et al. | |
| 2007/0044049 A1 | 2/2007 | Adams et al. | |
| 2007/0118242 A1 | 5/2007 | Stine et al. | |
| 2007/0143720 A1 | 6/2007 | Bickford et al. | |
| 2007/0174797 A1 | 7/2007 | Luo et al. | |
| 2007/0220455 A1 | 9/2007 | Joshi et al. | |
| 2007/0240085 A1 | 10/2007 | Bickford et al. | |
| 2008/0189664 A1 | 8/2008 | Bickford et al. | |

OTHER PUBLICATIONS

Mervyn Y. Tan, "A Survey of Distance Metrics Approximating L2 in the Construction of Voronoi Diagrams for VLSI Applications," 20th Computer Science Seminar (2004).

Luo et al., "An IC Manufacturing Yield Model Considering Intra-Die Variations," 43rd DAC (2006).

G. Grimmett et al., Probability and Random Processes, ISBN 0-19-857222-0, Oxford University Press (2003), p. 407, equations (11) and (12)).

Cho et al., "A Data-Driven Statistical Approach to Analyzing Process Variation in 65nm SOI Technology," Proceedings of the Intl Symposium on Quality Electronic design (ISQED), pp. 699-702 (2007).

J. Xiong et al., "Robust Extraction of Spatial Correlation," ISPD, pp. 2-9 (2006).

T.A. Brunner et al., "Process Monitor Gratings," Proc. of SPIE, 6518 (2007).

J.A.G. Jess et al., "Statistical Timing for Parametric Yield Prediction of Digital Integrated Circuits," DAC 2003, Jun. 2-6, Anaheim, CA (2003).

F. Pikus, "Integrated dfm Framework for Dynamic Yield Optimization," Proc. of SPIE, 6349 (2006).

A. Singhee et al., "Exploiting Correlation Kernels for Efficient Handling of Intra-die Spatial Correlation, With Application to Statistical Timing," In Proc. of Design Automation and test in Europe (2008).

R. Ghanem et al., "Stochastic Finite Elements: a Spectral Approach," Dover, revised edition, pp. 27-29 and 148-149 (2003).

\* cited by examiner

502

DENSITY FUNCTION OF ζ(x1,y1)

504

DENSITY FUNCTION OF ζ(x2,y2)

506

CORRELATION = −0.9

508

CORRELATION = 0

510

CORRELATION = 0.8

600

702

704

800

900

FOCUS AND DOSE VALUES (NEARLY) DO NOT VARY IN ONE CELL

FIND THE PROCESS WINDOW BY OPTICAL SIMULATION:

THE PROCESS WINDOW

UNDERDOSE, OUTSIDE OF THE PROCESS WINDOWN

NOMINAL DOSE, INSIDE OF THE PROCESS WINDOW

OVERDOSE, OUTSIDE OF THE PROCESS WINDOW

WAFER

THE SYSTEMATIC COMPONENT OF DEVIATION
FROM THE FOCAL PLANE FOR THE WAFER

=  +

DEVIATION FROM THE      SYSTEMATIC COMPONENT $S$     RANDOM COMPONENT $R$
FOCAL PLANE

1400A

FOCUS OFFSET
IN UNITS OF nm

MEAN FOCUS:
−48.5nm

6 SIGMA FOCUS
VARIATION:
107.4nm

1400B

DOSE IN UNITS
OF mJ/cm2

MEAN: 12.9
3 SIGMA: 0.438
(3.4%)

SLIGHTLY HIGHER
DOSE SEEN IN
WAFER CENTER (PROBABLY PEB
HOT PLATE)

US 8,522,173 B2

SPATIAL CORRELATION-BASED ESTIMATION OF YIELD OF INTEGRATED CIRCUITS

CROSS-REFERENCE TO RELATED APPLICATIONS

This application is a divisional of U.S. application Ser. No. 12/718,567 filed on Mar. 5, 2010, now U.S. Pat. No. 8,276,102, the contents of which are incorporated by reference herein.

FIELD OF THE INVENTION

The present invention relates to integrated circuit design, and more particularly, to techniques for estimating yield of an integrated circuit design.

BACKGROUND OF THE INVENTION

Integrated circuit design requires adherence to a basic set of design ground rules. Additional recommended rules may apply when one wants to make design changes to improve production yield of a particular design. However, even when these rules are followed, some design changes can conflict. For example, adding redundant wiring vias improves the yield with regard to electrical opens, but can degrade the yield with regard to electrical shorts as a result of the expanded metal shapes associated with the additional vias.

Thus, determining the effects certain design changes will have on yield is an important factor in integrated circuit development. In most instances, it is impractical (if at all possible) to physically implement design changes and then ascertain how those changes impact the yield, especially given the costs associated with manufacturing today's high-density circuits. Take for instance the case of very-large-scale integration (VLSI) macros which contain hundreds of thousands to millions of elements. It would be impractical, both from a time and budgetary standpoint, to 'mock up' different designs in hopes of determining which design provides the best yield.

The most effective solution to this problem would be a process by which the yield of a given design could be predicted before any actual manufacturing takes place. With VLSI, however, the sheer number of elements present prevents conventional yield estimation techniques from operating in a time-effective manner. Thus, manufacturing capabilities become severely limited by the design process.

Therefore, techniques that permit yield prediction in real time for high-density integrated circuits, such as VLSI, would be desirable.

SUMMARY OF THE INVENTION

The present invention provides techniques for estimating yield of an integrated circuit design. In one aspect of the invention, a method for determining a probability of failure of a very-large-scale integration (VLSI) query design is provided. The method includes the following steps. A Voronoi diagram is built comprising a set of shapes that represent the design, wherein each edge of a given one of the shapes represents a separate Voronoi cell in the Voronoi diagram. The Voronoi diagram is converted into a rectangular grid comprising $2^t \times 2^s$ rectangular cells, wherein t and s are chosen so that one rectangular cell contains from about one to about five Voronoi cells. A probability of failure is computed for each of the cells in the grid. The cells in the grid are merged pairwise. A probability of failure for the merged cells is recomputed which accounts for a spatial correlation between the cells. The pairwise merge and recompute steps are performed s+t times to determine the probability of failure of the design.

In another aspect of the invention, a method for estimating yield of a wafer having a plurality of chips of a given design printed thereon is provided. The method includes the following steps. The chip design is divided into a plurality of rectangular cells, wherein each of the cells is chosen to be small enough such that focus and dose values across the cell can be assumed to be constant. A process window is determined for each of the cells. The focus and dose values on the wafer are measured. The measured focus and dose values are used to determine a Gaussian random component of the focus and dose values. The focus and dose values on the wafer are represented as a sum of a systematic component of the focus and dose values and the Gaussian random component of the focus and dose values. Wafer yield is estimated based on a number of the chips on the wafer for which at each point (x, y) the focus and dose values, as represented as the sum of the systematic component of the focus and dose values and the Gaussian random component of the focus and dose values, belong to a corresponding one of the process windows.

A more complete understanding of the present invention, as well as further features and advantages of the present invention, will be obtained by reference to the following detailed description and drawings.

DETAILED DESCRIPTION OF PREFERRED EMBODIMENTS

Figure 1:
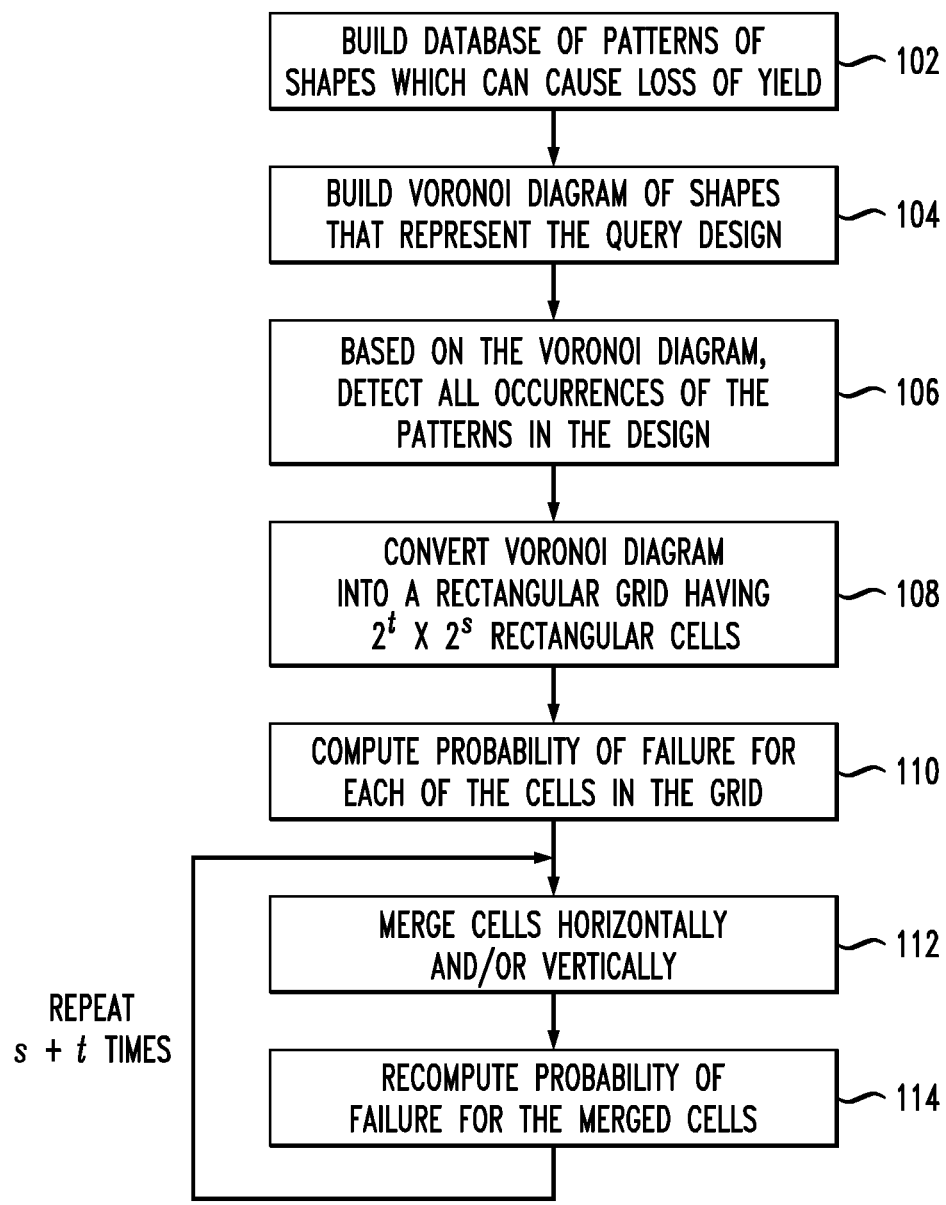
FIG. 1 is a diagram illustrating an exemplary methodology for determining a probability of failure of a very-large-scale integration (VLSI) query design according to an embodiment of the present invention.

FIG. 1 is a diagram illustrating exemplary methodology 100 for determining a probability of failure of a very-large-scale integration (VLSI) query design. The present techniques provide VLSI design engineers with a tool to trace causes of yield loss in a design. Importantly, the present techniques can be performed fast enough to allow adjustments to be made to the design in a real-time interactive mode.

In step 102, a database is built of patterns of shapes which can potentially cause a loss of yield of a design. The most likely candidates are the patterns which break some recommended design rules and are only a couple of nanometers (nm) away from breaking some design ground rule. For example, a typical ground rule is that two wires cannot be closer than 90 nm to each other. Therefore, if two wires in a given pattern are 92 nm away from each other, then that pattern is only two nm away from breaking the ground rule. This database has to be built only once for a given technology, and can then be used to predict yield for all query designs.

All occurrences of the patterns from the database in the design are detected (also referred to herein as "hotspots"). This seemingly very hard problem solves easily in O(NlogN) time by means of Voronoi diagram. Namely, in step 104, a Voronoi diagram is built of a set of shapes that represent the query design and which belong to a universal bounding box. Each edge of a shape represents a separate Voronoi cell in the Voronoi diagram (wherein an edge of the Voronoi diagram is a subset of locus points equidistant from some two edges of the original shapes). Each Voronoi cell is the locus of points which are closer to a given shape edge than to any other shape edge (i.e., the Voronoi diagrams are built with respect to the shape edges (segments), not the shapes themselves, and as such there is a one-to-one correspondence between shape edges and Voronoi cells). By way of example only, each rectangle of the design has exactly four Voronoi cells corresponding to it. In step 106, based on the Voronoi diagram, all occurrences of the patterns are then detected in a single pass through the edges of the Voronoi diagram by examining some simple quantitative characteristics of the adjacent Voronoi cells. This process is described in detail in U.S. application Ser. No. 12/174,924, entitled "Implementing Integrated Circuit Yield Estimation Using Voronoi Diagrams," filed by M. Monkowski et al., filed on Jul. 17, 2008 (hereinafter "Monkowski"). By way of example only, in Monkowski a lithography simulation layout is partitioned into Voronoi regions using an octal distance metric, wherein each exterior Voronoi edge region is bounded by a single edge of a design shape and two or more bisectors. Additional bisectors or transition boundaries may be added for Voronoi regions containing vertices not connected by a bisector to the design shape to simplify the Voronoi regions to three or four sides. Failure probabilities can be pre-computed (and then obtained from lookup tables followed by a simple arithmetic computation) as a function of edge orientation and spacing (on the Voronoi Diagram).

The probability of failure can be obtained by considering the edges of the Voronoi diagram one at a time, independently of each other (i.e., in a "single pass") as the edges are disjoint from one another. By comparison, if the original shapes are used, groups of interacting shapes have to be considered. These groups (vicinity clusters) can overlap one another (not disjoint) and it is not an easy task to identify them. The Voronoi diagram is an excellent means for identifying the vicinity clusters of interacting shapes, as one Voronoi edge equates with one cluster. See also, Mervyn Y. Tan, "A Survey of Distance Metrics Approximating $L_2$ in the Construction of Voronoi Diagrams for VLSI Applications," $20^{th}$ Computer Science Seminar (2004) and Luo et al., "An IC Manufacturing Yield Model Considering Intra-Die Variations," $43^{rd}$ DAC (2006).

The term "patterns of shapes," as used herein, refers to the vicinity clusters of shapes (the shapes being the original design shapes, such as the shapes that represent the query design (see description of step 104 above)). As highlighted above, each cluster corresponds to one Voronoi edge. With Voronoi diagrams there is a one-to-one correspondence between its edges and the groups of interacting shapes which match one of a given number of patterns (vicinity cluster patterns).

Binary subdivision is then used to predict yield of the query design, wherein yield is equal to 100 percent (%) minus the probability of failure. In step 108, the Voronoi diagram is converted into a rectangular grid comprising a plurality of rectangular cells. Namely, D is the maximum diameter of the Voronoi cells in the design. The bounding box of the design is partitioned into $2^t \times 2^s$ rectangular cells with side lengths between D and 2D, wherein t and s are chosen so that one rectangular cell contains from about one to about five Voronoi cells. Voronoi cells and rectangular cells of the grid should be approximately equal in size, with the best proportion being one rectangular cell for about two Voronoi cells. However, because the correlation between process parameters at any two hotspots at a distance less than 3,000 nm (which is greater than or equal to 10 times the diameter of a voronoi cell) is practically 100%, any proportion (of rectangular cell(s) to Voronoi cell(s)) between 1:10 and 10:1 will give the same final result.

In step 110, a probability of failure is computed for each of the cells in the grid. Since the sizes of the cells in the grid are typically so small that the value of the process parameters (e.g., dose, focus, photoresist thickness) do not vary in a single cell (for example, for 12 s technology the cells in the grid have sides of from about 200 nm to about 500 nm), it may be assumed that the random events of having a failure in Voronoi cells $C_1, C_2, \ldots C_k$ whose centers belong to the same grid cell are completely correlated. That is, the probability of failure ($P_{fail}$) of the whole rectangular cell is equal to the probability of failure of the pattern within that rectangular cell most vulnerable to deviation of process parameters from their standard values, i.e., $$P_{fail}(\text{the rectangular cell}) = \max(P_{fail}(C_1), P_{fail}(C_2), \ldots, P_{fail}(C_k)).$$

The result of steps 108 and 110 is a $2^r \times 2^s$ rectangular grid with the computed probabilities of failures for each rectangle (see FIG. 2, described below).

The next step is, given a list of pairs {coord. of the center of Voronoi cell, the yield loss in the cell} find the total yield loss (i.e., the probability of failure or 100%−yield) of the whole design. This problem would be easy to solve if the random events of failures at different cells were independent.

Unfortunately it is not so. Suppose Voronoi cell $C_1$ produces a failure. There has to be a reason behind this. The reason is usually a large deviation of dose, focus or some other process parameter from its nominal value (if the manufacturing process is perfect at a given point and the design complies with all ground rules it is impossible to have a failure). That means that the deviation of the process parameters from their nominal values is most probably large in any cell $C_2$ which is close to $C_1$. Consequently the event "$C_1$ fails" implies with high probability that "$C_2$ fails." If the formula for independent events ($P_{fail}(C_1$ or $C_2)=P_{fail}(C_1)+P_{fail}(C_2)-P_{fail}(C_1) \cdot P_{fail}(C_2)$) is used, the probability of failure of the design will be greatly overestimated. In order to provide a good yield estimation, the spatial correlation between the failures at different points must be taken into account.

Provided herein are techniques for fast and accurate prediction of the probability of failure of the whole design given the probabilities of failures and the coordinates of all the patterns detected from the Voronoi diagram and the spatial correlation parameter C (where C depends only on the manufacturing process, not on the design).

Specifically, given a two dimensional array of probabilities of failure of each cell in the rectangular grid (see, e.g., steps 108 and 110, described above), the estimated probability of failure of the whole design is determined in s+t number of steps. At each step cells are merged horizontally or vertically by two and the probabilities are recomputed. For example, in step 112, the cells in the grid are merged horizontally and/or vertically in a pairwise manner. The merging of cells is demonstrated, for example, in FIG. 3, described below. In step 114, the probability of failure is recomputed for the merged cells. The probability of failure of each "new" cell created by the merging is a function of three variables: the probabilities of failure of the two original cells $p_1$, $p_2$ and the distance between their centers r, i.e., $f(p_1, p_2, r)$ (see FIG. 3). Steps 112 and 114 are repeated s+t times to determine the probability of failure of the query design.

In order to find the right function $f(p_1, p_2, r)$, some reasonable assumptions are made about the physical nature of the failures. The correctness of these assumptions can be checked by comparing the predicted probability of failure with the actual probability of failure obtained experimentally.

The simplest way would be to assume that the failures in all cells are independent. In that case one would have:

$$f(p_1, p_2, r) = p_1 + p_2 - p_1 p_2,$$

which is a "first order" or "no correlation" model. Unfortunately the first order model fails to give an accurate yield estimate for a majority of designs. In reality, local failures are caused by deviations of local process parameters such as focus, dose and photoresist thickness from their nominal values. The values of these parameters are not independent in neighboring cells. Rather, the values are to be modeled as Gaussian random variables at each point with positive pairwise correlations. The closer the points are to one another, the larger the correlation. For example, if there are 100 instances of a pattern all positioned at a very small distance from a fixed point on the design and one instance contributes 0.001% to the probability of failure, then all 100 instances will contribute again only 0.001% (not 100·0.001%) because the random events of having a failure at each instance are almost totally correlated.

In the present techniques, several assumptions are made. First, it is assumed that the cause of failure in a cell with center (x, y) is the deviation of some "universal" process parameter $\zeta(x, y)$ from its nominal value. Without loss of generality, it is assumed that this nominal value is zero at each point. The universal process parameter $\zeta(x, y)$ is introduced solely for the purpose of building the model, it does not correspond to any real physical quantity. It is assumed that $\zeta(x, y)$ is a two dimensional Gaussian stochastic process with expectation zero. In particular, at each point, $\zeta(x, y)$ is a Gaussian random variable with expectation zero. The deviation $\sigma_{(x,y)}$ of $\zeta(x, y)$ at each point is chosen so that the probability of failure of each cell is equal to the probability of failure computed from the Voronoi diagram (see below).

It is also assumed that, given a random event, the cell (x, y) causes a failure if $\zeta(x, y)$ does not belong to the segment [−1, 1]. Then at each point (x, y), $\sigma_{(x, y)}$ and the probability of failure $p_{(x, y)}$ are functions of each other:

at point (x, y):

$$p = 1 - \int_{-1}^{1} \frac{1}{\sigma\sqrt{2\pi}} e^{-\frac{1}{2}(\frac{t}{\sigma})^2} dt = 2\left(1 - F\left(\frac{1}{\sigma}\right)\right),$$

wherein $$F(s) \stackrel{def}{=} \int_{-\infty}^{s} \frac{1}{\sqrt{2\pi}} e^{-\frac{1}{2}t^2} dt$$

is the normal Gaussian cumulative distribution function, and wherein $$\sigma = \frac{1}{F^{inv}\left(1 - \frac{p}{2}\right)}. \quad (1)$$

Equation 1 is depicted graphically in FIG. 8, described below.

Since the probabilities of failure for each cell are known from the Voronoi diagram, $\sigma_{(x, y)}$ is chosen according to Equation 1 (above) and the random Gaussian variables $\zeta(x, y)$ at the center (x, y) of each cell become well defined. However, the Gaussian stochastic process y) is not yet well defined. Namely, only marginal distributions of $\zeta(x, y)$ at each fixed point are defined, but not the joint distribution. To define $\zeta(x,y)$ completely, the correlations (see below) between the marginal distributions at each pair of points need to be described (see immediately below).

An additional assumption is made about the process, namely that $\zeta(x, y)$ is Markovian. That is, for any three points $v_1, v_2, v_3$ such that $v_2$ belongs to the segment $$\overline{v_1, v_3},$$

$\forall c \in \mathbb{R}$: the random variables $\zeta(v_1)|(\zeta(v_2)=c)$ and $\zeta(v_3)|(\zeta(v_2)=c)$ are independent.

This assumption is a natural assumption about physical processes such as dose or off-focus distance. It is known from the theory of stochastic processes (see, for example, G. Grimmett et al., *Probability and Random Processes*, ISBN 0-19-857222-0, Oxford University Press (2003), p. 407, equations (11) and (12)) that the correlations between the values of a Markovian Gaussian process at points $v_1, v_2, v_3$; $v_2 \in [v_1, v_3]$ satisfy $$\text{Cor}(v_1, v_2)\text{Cor}(v_2, v_3) = \text{Cor}(v_1, v_3),$$

which implies the following expression for the spatial correlation: for any two points $w_1$ and $w_2$ Cor $(\zeta(w_1), \zeta(w_2)) = e^{-C \cdot distance\ (w1,\ w2)}$ for some constant C>0 be used instead of Markovian expC*dist.

In the case of the Markovian process, the constant C can be determined by a linear regression method using analysis of manufacturing data. See for example, Cho et al., "A Data-Driven Statistical Approach to Analyzing Process Variation in 65 nm SOI Technology," Proceedings of the Int'l Symposium on Quality Electronic design (ISQED), pages 699-702 (2007).

This spatial correlation function is the simplest and most natural for process parameters, just as a Gaussian distribution is the most natural distribution to assume about a physical random variable. In general, not every monotonically decreasing function can be a spatial correlation function. For a detailed description of possible spatial correlation functions, see, for example, J. Xiong et al., "Robust Extraction of Spatial Correlation," ISPD, pgs. 2-9 (2006). If some special information is known about the behavior of the process parameters, one of these functions may need to be used instead of Markovian $e^{-C \cdot dist}$.

The discrete version of $\zeta(x, y)$ is a multivariate Gaussian variable with one coordinate per each cell. It is now well defined wherein the expectation is:

$$M\zeta(x,y)=0 \text{ at all points,}$$

the deviation is:

$$\sigma(\zeta(x, y)) = \frac{1}{F^{inv}\left(1 - \frac{p(x, y)}{2}\right)},$$

where p(x, y) is known from the Voronoi diagram
and the correlation is:

$$\text{Cor}(\zeta(x_1,y_1),\zeta(x_2,y_2))=e^{-C\sqrt{(x1-x2)^2+(y1-y2)^2}}.$$

The scalar parameter C remains the same for all designs for a given technology and has to be defined experimentally.

Now an explicit expression for $f(p_1, p_2, r)$ can be written. A double cell, i.e., two merged cells, causes a failure if and only if at least one of its subcells, i.e., at least one of the two merged cells, causes a failure. That is a double cell fails if and only if $(\zeta(x_1, y_1), \zeta(x_2, y_2))$ does not belong to $[-1, 1] \times [-1, 1]$, wherein $(x_1, y_1), (x_2, y_2)$ are the centers of the two subcells (see, for example, FIG. 4). The manipulations are based on the basic formulae for multivariate Gaussian distribution (see Equations 2 and 3, below):

$$P = \int f(p_1, p_2, r)$$

$$= 1 - \frac{1}{2\pi\sigma_1\sigma_2\sqrt{1-p^2}}\int_{-1}^{1}\int_{-1}^{1} \exp\frac{\frac{s^2}{\sigma_1^2} - \frac{2pst}{\sigma_2\sigma_1} + \frac{t^2}{\sigma_2^2}}{-2(1-p^2)}\,ds\,dt,$$

wherein $$\sigma_1 = \frac{1}{F^{inv}\left(1 - \frac{p_1}{2}\right)}, \sigma_2 = \frac{1}{F^{inv}\left(1 - \frac{p_2}{2}\right)}, p = e^{-Cr}.$$

$f(p_1, p_2, r)$ does not express via elementary functions. The best way to compute $f(p_1, p_2, r)$ in practice is to use linear interpolation by a set of points in the cube $\sigma_1 \in [0, 1], \sigma_2 \in [0, 1], p(r) \in [0, 1]$ (a 21×21×21 set used in the implementation seems to give a satisfactory precision).

The above binary subdivision yield prediction technique provides a realistic estimate for the yield of VLSI designs using only a linear runtime and a linear amount of memory in the number of Voronoi cells and consequently in the number of elementary shapes in the design. The present binary subdivision yield prediction technique is only a heuristic, i.e., it does not guarantee the correct result in all cases.

The reason for not making an exact determination is the strict runtime constraint. VLSI designs contain hundreds of thousands to millions of elements. Thus, to make a yield estimator that is able to run in an interactive mode, it must be restricted to operations which can be run in linear time (e.g., $N^2$ operations would already require $10^{12}$ floating point operations, each of which takes at least 10 clock cycles).

A mathematically 'correct' way of computing the probability of failure of a design is to compute the whole N-by-N covariance matrix of $\zeta(x, y)$, wherein N is the number of cells in the Voronoi diagram, and then find the probability that all the coordinates of $\zeta(x, y)$ belong to $[-1, 1]$ (by a numerical integration or Monte Carlo method). Unfortunately, this method requires $N^2$ memory and at least $N^3$ runtime which makes it practically useless.

Figure 2:
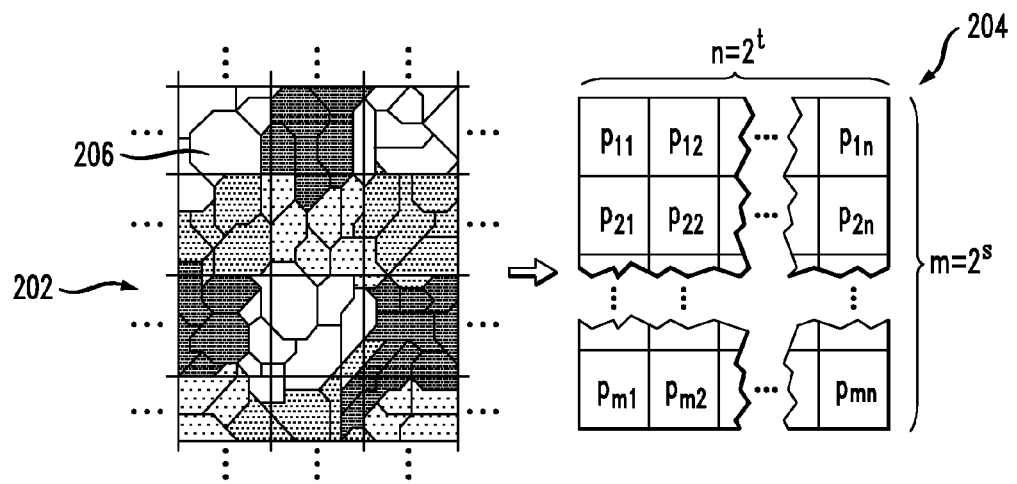
FIG. 2 is a diagram illustrating a Voronoi diagram being converted into a rectangular grid according to an embodiment of the present invention.

FIG. 2 is a diagram illustrating Voronoi diagram 202 being converted into rectangular grid 204. Voronoi diagram 202 comprises a set of shapes 206 that represent the query design (see, for example, FIG. 1, described above). Rectangular grid 204 comprises $2^t \times 2^s$ rectangular cells with the computed probabilities of failure P for each cell.

Figure 3:
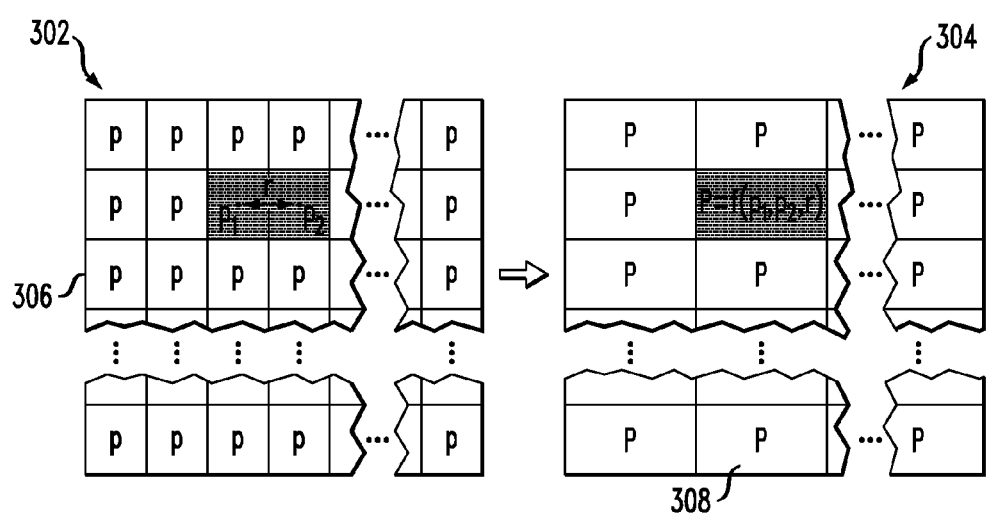
FIG. 3 is a diagram illustrating rectangular cells being merged horizontally with one another in a pairwise manner according to an embodiment of the present invention.

FIG. 3 is a diagram illustrating rectangular cells 306 of rectangular grid 302 being merged horizontally with one another in a pairwise manner (i.e., by two cells). As described, for example, in conjunction with the description of FIG. 2, above, each cell in the grid has a computed probability of failure P. Based on the computed probabilities of failure of pairs of adjacent cells that are to be merged, e.g., $P_1$ and $P_2$, and a distance r between the centers of the cells, a new probability of failure is recomputed for the merged cells (double cells), e.g., double cells 308 of rectangular grid 304. While FIG. 3 shows the cells of the rectangular grid all being merged horizontally, according to the present techniques, one or more pairs of cells may also be merged vertically.

Figure 4:
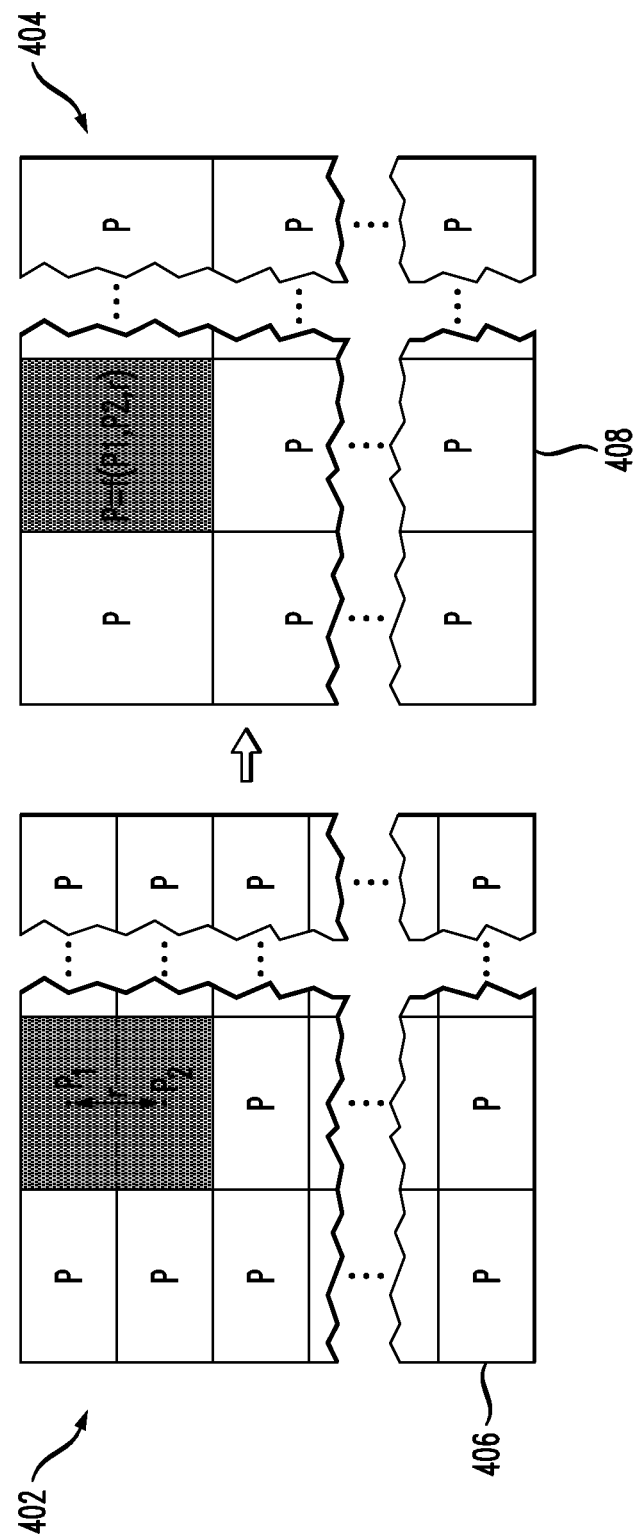
FIG. 4 is a diagram illustrating rectangular cells being merged vertically with one another in a pairwise manner according to an embodiment of the present invention.

FIG. 4 is a diagram illustrating rectangular cells 406 of rectangular grid 402 being merged vertically with one another in a pairwise manner (i.e., by two cells). By way of example only, each rectangular cell 406 may be the result of a horizontal pairwise merging of cells, such as is illustrated in FIG. 3. As described, for example, in conjunction with the description of FIG. 2, above, each cell in the grid has a computed probability of failure P. Based on the computed probabilities of failure of pairs of adjacent cells that are to be merged, e.g., $P_1$ and $P_2$, and a distance r between the centers of the cells, a new probability of failure is recomputed for the merged cells (double cells), e.g., double cells 408 of rectangular grid 404.

Figure 5A:
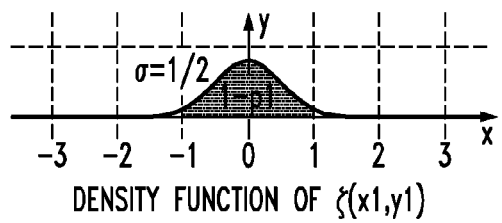
FIGS. 5A-E are graphs illustrating probability of failure being computed in a merged cell for different correlation coefficients according to an embodiment of the present invention.
Figure 5B:
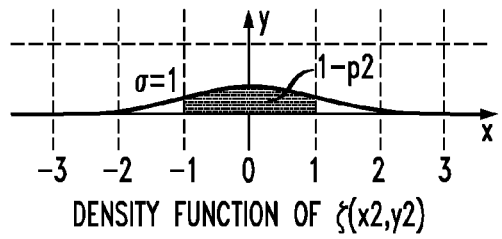
Figure 5C:
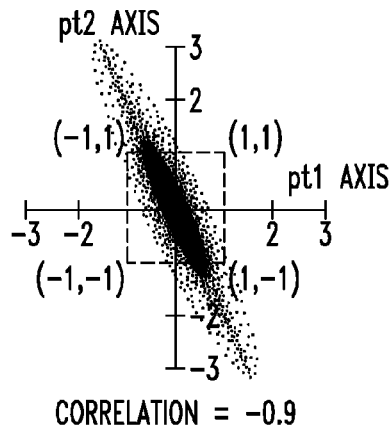
Figure 5D:
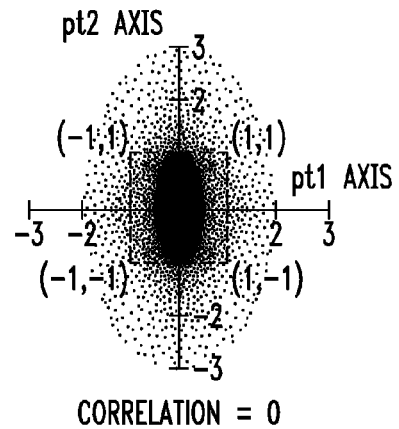
Figure 5E:
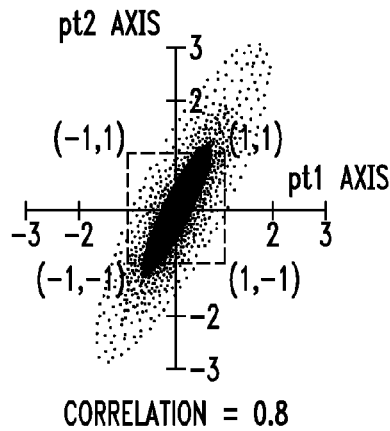

FIGS. 5A-E are graphs illustrating the probability of failure, i.e., $P=f(p_1,p_2,r)$, being computed in a double cell for different correlation coefficients. 1−P is equal to the integral of the joint distribution function over the [−1, 1]×[−1, 1] square. Specifically, FIGS. 5A and 5B are graphs 502 and 504 illustrating density functions of the process parameter ζ(x, y) for subcells 1 and 2, respectively. The term "subcells," as used herein, refers to the individual cells that have been merged into a double cell. FIGS. 5C-E are graphs 506, 508 and 510 illustrating the joint distribution function P=ƒ(p₁, p₂, r) for correlation coefficients −0.9, zero and 0.8, respectively.

The following description provides some basic facts about multivariate Gaussian distributions. With regard to a one dimensional Gaussian distribution with expectation μ and deviation σ, the standard normal Gaussian density function is:

$$\int(x) = \frac{1}{\sqrt{2\pi}} e^{-\frac{1}{2}x^2}, \; \mu = 0, \sigma = \sqrt{\text{Var}} = 1.$$

The general Gaussian density function is:

$$\int(x) = \frac{1}{\sigma\sqrt{2\pi}} e^{-\frac{1}{2}(\frac{x-\mu}{\sigma})^2}.$$

Figure 6:
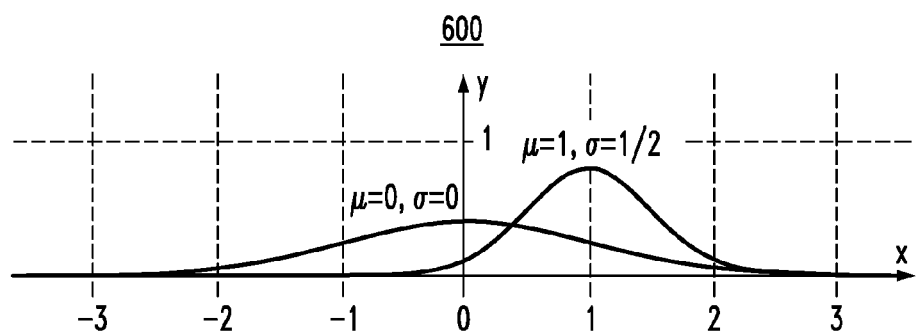
FIG. 6 is a graph illustrating Gaussian density functions according to an embodiment of the present invention.

FIG. 6 is graph 600 illustrating Gaussian density functions. Specifically, graph 600 shows the Gaussian density function wherein the expectation M and the deviation σ are both zero, and wherein the expectation M is one and the deviation σ is 0.5.

With regard to a standard normal multivariate Gaussian distribution, let ζ be a random variable taking values in $\mathbb{IR}^n$. ζ is called standard normal Gaussian if it has density function:

$$\int(x) = (2\pi)^{-\frac{n}{2}} e^{-\frac{1}{2}(x,x)}, \; x \in \mathbb{IR}^n.$$

$$M\xi = \overline{0}, \; \text{Var}\xi \stackrel{\text{def}}{=} M((\xi - M\xi), (\xi - M\xi)) = n.$$

With regard to a multivariate Gaussian distribution with expectation vector μ and deviation linear symmetric positive definite operator S, ζ is called Gaussian if ζ=Aξ+μ for some standard normal Gaussian random variable ξ, non-degenerate linear operator A: $\mathbb{IR}^n \to \mathbb{IR}^n$ and vector $\mu \in \mathbb{IR}$. This is equivalent to the statement that ζ has density function:

$$\int(x) = |\det A|^{-1} (2\pi)^{-\frac{n}{2}} e^{-\frac{1}{2}(A^{-1}(x-\mu), A^{-1}(x-\mu))}. \quad (2)$$

Figure 7A:
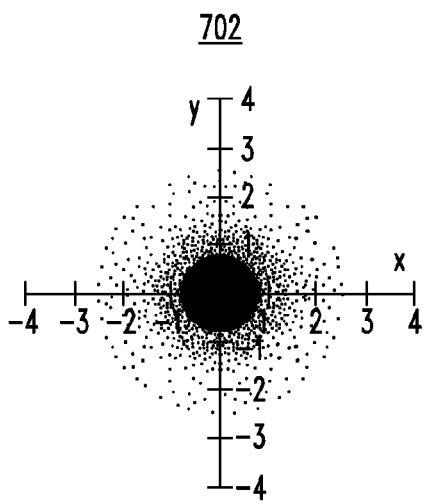
FIGS. 7A and 7B are graphs illustrating a Gaussian distribution of process parameter $\zeta$ being determined according to an embodiment of the present invention.
Figure 7B:
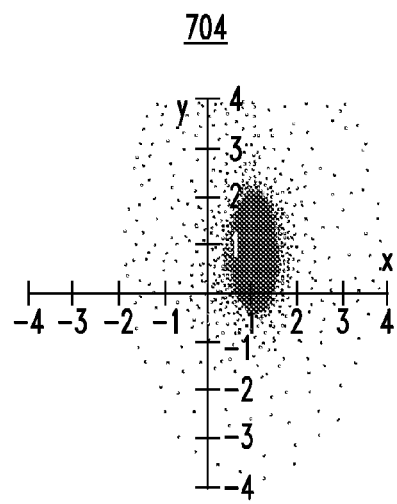

To get the graph of distribution of ζ=Aξ+μ, apply the affine transform x→Ax+μ to the graph of standard normal Gaussian distribution and then rescale the color intensity by $|\det A|^{-1}$ times. See, for example, FIGS. 7A and 7B. FIG. 7A is graph 702 illustrating a standard normal two dimensional Gaussian distribution. FIG. 7B is graph 704 illustrating the Gaussian distribution for $$A = \begin{pmatrix} 1 & 0 \\ 0 & 2 \end{pmatrix}, \mu = \begin{pmatrix} 1 \\ 1 \end{pmatrix}.$$

The following statement can then be made that any non-degenerate linear operator $A: \mathbb{IR}^n \to \mathbb{IR}^n$ can be represented uniquely as a product of a symmetric positive definite operator S and an orthogonal operator C:

$$A = SC.$$

Obviously, the distribution of Aξ+μ=SCξ+μ does not depend on C.

$$\int(x) = (\det S)^{-1} (2\pi)^{-\frac{n}{2}} e^{-\frac{1}{2}(S^{-1}(x-\mu), S^{-1}(x-\mu))}.$$

The linear symmetric positive definite operator S is called "deviation" of Gaussian random variable SCξ+μ. Vector μ is the mathematical expectation of SCξ+μ. The following statement is then also made that there is a one to one correspondence between distributions of Gaussian random variables and pairs $$\left( \underbrace{\text{deviation}}_{\substack{\text{a symmetric positive} \\ \text{definite operator}}}, \underbrace{\text{expectation}}_{\text{a vector}} \right).$$

With regard to a multivariate Gaussian distribution as a joint distribution of coordinates, tensor notation is used. For example, instead of vector v one writes $v^i$ (a onetime contravariant tensor), instead of linear functional l one writes $l_i$ (a onetime covariant tensor) and instead of bilinear functional B one writes $B_{ij}$ (a twice covariant tensor). The small letter indexes are reserved for the tensor notation only. Assigning values to these indexes makes no sense. The capital letters and numbers are used as regular indexes, i.e., to enumerate elements of a finite set. For example, vectors $a_1, a_2, \ldots, a_N$ in tensor notation write as $a_1^i, a_2^i, \ldots, a_N^i$.

Let $\zeta^i = S_j^i \xi^j + \mu^i$ be a Gaussian random variable and $\{x_1^i, x_2^i, \ldots, x_N^i\}$ be an orthogonal basis in $\mathbb{IR}^N$. In this basis, $\mu^i$ is a column of coordinates and $S_j^i$ is a symmetric positive definite matrix. The distribution of $\zeta^i$ becomes the joint distribution of the coordinates $1 \ldots N$ of $\zeta^i: x_i^K \zeta^i$, $K=1 \ldots N$, where $\{x_i^1, x_i^2, \ldots, x_i^N\}$ is the basis of $\text{conj} \mathbb{IR}^N$ conjugate to $\{x_1^i, x_2^i, \ldots, x_N^i\}$.

The following statement is then made that any marginal distribution of a joint Gaussian distribution is Gaussian. The following definition is then presented that the covariance of two (jointly distributed) random variables φ, and ψ

$$\text{Cov}(\phi, \psi)$$

is equal to $$M((\phi - M\phi)(\psi)).$$

It is notable that the covariance of two independent variables is zero.

The following statement is then made that:

$$\forall 1 \leq I \leq N, 1 \leq J \leq N : \text{Cov}(x_m^I \zeta^m, x_n^J \zeta^n) = M((x_m^I S_p^m \xi^p)$$
$$(x_n^J S_q^n \xi^q)) = x_m^I S_p^m x_n^J S_q^n M(\xi^p \xi^q) =$$
$$x_m^I S_p^m x_n^J S_q^n \delta^{pq} = x_m^I S_k^m S_k^n x_n^J.$$

That is the covariance of the I-th coordinate of $\zeta^k$ and the J-th coordinate of $\zeta^k$ is equal to the element (I,j) of the matrix $SS^T$.

The following definition is then presented that bivector $V^{ij} \stackrel{\text{def}}{=} S_k^i S_k^j$ is called the covariance bivector of $\zeta^k$. In matrix notation in the basis $\{x_1^i, x_2^i, \ldots, x_N^i\} V = SS^T$. The following statement is then made that the joint distribution of the first (without loss of generality any pairwise different) M coordinates of $\zeta^I \{x_i^1 \zeta^i, x_i^2 \zeta^i, \ldots, x_i^M \zeta^M \zeta^i\}$, $M \leq N$ is Gaussian with the expectation $$\begin{pmatrix} \mu^1 \\ \mu^2 \\ \vdots \\ \mu^N \end{pmatrix}$$

and the covariance matrix $$\begin{pmatrix} V^{11} & V^{12} & \ldots & V^{1M} \\ V^{21} & V^{22} & \ldots & V^{2M} \\ \vdots & \vdots & \ddots & \vdots \\ V^{M1} & V^{M2} & \ldots & V^{MM} \end{pmatrix},$$

wherein $\mu^1, \mu^2, \ldots, \mu^N$ denote the corresponding coordinates of $\mu^i$ and $V^{11}, \ldots, V^{MM}$ denote the corresponding elements of the matrix representing $V^{ij}$.

In particular, each coordinate of $\zeta^i$ is a Gaussian random variable with $Var(x_k^I \zeta^k) = \text{element}(I,I)$ of $V$ and $M(x_k^I \zeta^k) = \text{coordinate } I$ of $\mu$.

It is notable that the analog of the above statement for the deviation matrix S will not hold. That is, the deviation matrix of the joint distribution of the first N coordinates of $\zeta^k$ is (generally) not equal to the $[1 \ldots N] \times [1 \ldots N]$ submatrix of S.

The following definition regarding correlation is then presented that the correlation of two scalar jointly distributed random variables $\phi, \psi \text{Cor}(\phi, \psi)$ is equal to $$\frac{Cov(\phi, \psi)}{\sqrt{Var(\phi)} \sqrt{Var(\psi)}}.$$

Let scalar variables x and y have a joint Gaussian distribution. Denote $Cor(x, y)$ by $\rho$. Then the covariance matrix has form $$\begin{pmatrix} \sigma_x^2 & \rho\sigma_x\sigma_y \\ \rho\sigma_y\sigma_x & \sigma_y^2 \end{pmatrix} = \left( \frac{1}{(1-\rho^2)\sigma_x^2\sigma_y^2} \begin{pmatrix} \sigma_y^2 & -\rho\sigma_x\sigma_y \\ -\rho\sigma_y\sigma_x & \sigma_x^2 \end{pmatrix} \right)^{-1}. \quad (3)$$

Consider the normalized random variables:

$$\frac{x - \mu_x}{\sigma_x} \text{ and } \frac{y - \mu_y}{\sigma_y}.$$

$$Var\left(\frac{x - \mu_x}{\sigma_x} - \frac{y - \mu_y}{\sigma_y}\right) = 2(1 - \rho), Var\left(\frac{x - \mu_x}{\sigma_x} + \frac{y - \mu_y}{\sigma_y}\right) = 2(1 + \rho).$$

Thus, the correlation of x and y has the following sense:
$\rho$ is close to $-1$:

$$\frac{x - \mu_x}{\sigma_x}$$

with high probability is "nearly equal" to $$-\frac{y - \mu_y}{\sigma_y},$$

$\rho = 0$: x and y are independent,
$\rho$ is close to 1:

$$\frac{x - \mu_x}{\sigma_x}$$

with high probability is "nearly equal" to $$\frac{y - \mu_y}{\sigma_y}.$$

The following statement is then made that if $x_1, x_2, \ldots, x_n$ are scalar random variables with a joint Gaussian distribution, then the one dimensional distributions of $x_i$, $1 \leq i \leq n$ together with the pairwise correlations $Cor(x_i, x_j)$ $1 \leq I \leq j \leq n$ uniquely define the joint distribution, and vice versa.

Figure 8:
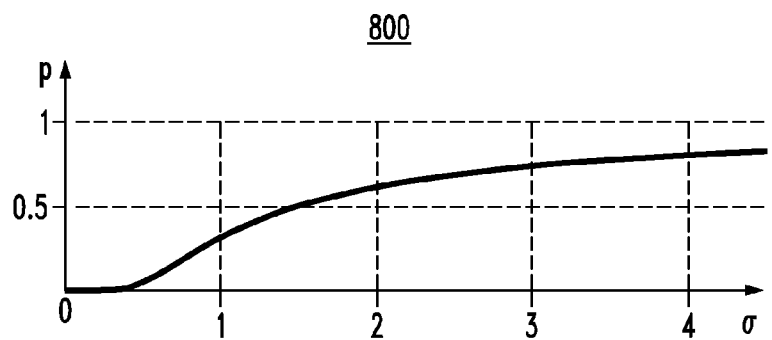
FIG. 8 is a graph illustrating that a dependency between a deviation of a process parameter and a probability of failure is a one-to-one correspondence according to an embodiment of the present invention.

FIG. 8 is graph 800 depicting the function presented in Equation 1, above. Graph 800 emphasizes that the dependency between the deviation $\sigma$ (i.e., of a universal process parameter $\zeta$) and the probability of failure p is a one-to-one correspondence.

Also provided herein is a methodology for finding the wafer yield for a given VLSI design. Wafer yield is defined herein as an average percentage of chips on a wafer which will be manufactured correctly. The methodology is based on the following main ideas (which will be described in further detail below). First, physical data (obtained by scatterometry) is used to determine one or more characteristics of the lithographical equipment being used for fabricating the design. These characteristics include, but are not limited to, the systematic component of focus and dose values across the wafer and the covariance kernel (i.e., the dependency of correlation on distance wherein the correlation of the values of process parameters (such as off focus distance or dose) at any two given points depends only on distance between these two points) for the random deviation from the systematic component of the focus and dose values across the wafer. A systematic component is what repeats from one exposure to another (see, for example, FIGS. 12A, 12B and 13, described below), the other component is random noise. Second, stochastic processes theory is used to reduce the time of one Monte Carlo iteration to just const·(area_of_the_wafer+ r·area_of_one_chip), where r is typically a small ($\leq 50$) number of eigenvectors of a certain covariance kernel matrix which eigenvalues exceed a predefined precision threshold, and const is the time required for approximately 5-10 floating point operations. The unit of area is normally a 500 nm-by-500 nm cell (see below).

If all design ground rules (see above) are satisfied, then it is assumed that a process window (i.e., a range of process parameter (e.g., focus and dose) values, see description of FIG. 9, below) is non-empty (i.e., there is some range of process parameter (e.g., focus and dose) values associated with a given process window) at each point of the design. In other words, with strict adherence to a set of design ground rules the only reason for wafer yield loss is the deviation of the process parameters (e.g., focus and dose) from their nominal values beyond a size of the (non-empty) process window at some points of the design. For each chip on the wafer, the present techniques use fast Monte Carlo modeling of the lithographical process to determine with what probability the condition "the process parameters must belong to the process window" is broken at at least one point of the chip.

Figure 9:
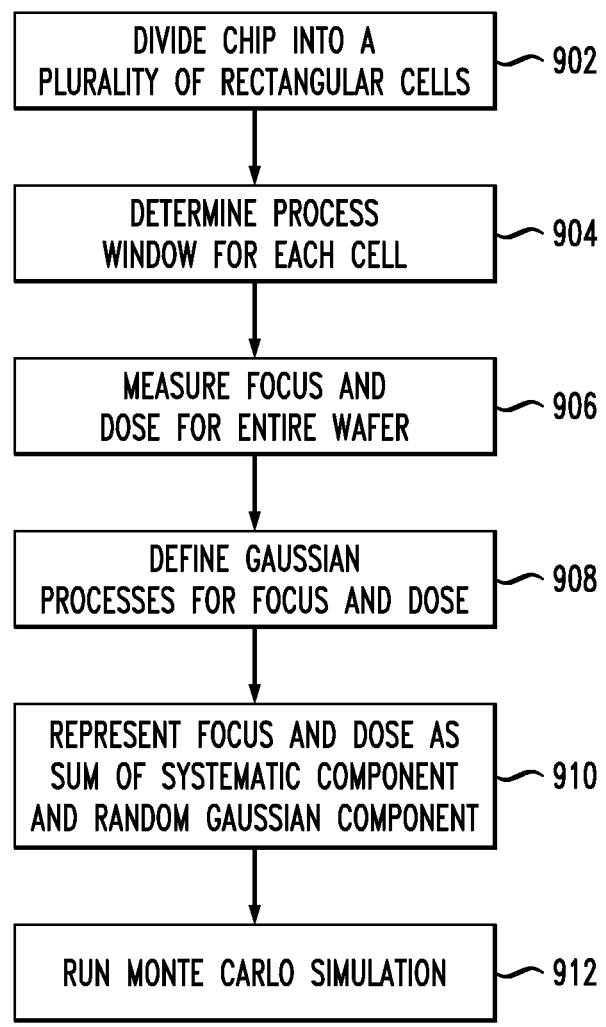
FIG. 9 is a diagram illustrating an exemplary methodology for estimating yield of a wafer having a plurality of chips of a given design printed thereon according to an embodiment of the present invention.

Specifically, FIG. 9 is a diagram illustrating exemplary methodology 900 for estimating yield of a wafer having a plurality of chips of a given design printed thereon. In this example, all of the chips on the wafer have an identical design. The chips only print differently because of different process parameters at different parts of the wafer. In step 902, the chip design, i.e., the set of shapes that make up the chip design, is divided into a plurality of rectangular cells. The rectangular cells are chosen to be small enough such that the value of focus and dose across each cell can be assumed to be constant. See, for example, FIG. 10, described below. The "location" of any cell $C_{i,j}$ on the chip is the location of its centroid, denoted by $(x_{i,j}, y_{i,j})$.

Litho simulations are then used to define a process window, i.e., a set of process parameters under which the printed image of the chip design is good. Specifically, in step 904, a process window is determined for each cell by running several optical simulations for different values of focus and dose for each cell. For example, each simulation tests a pair of parameters (focus, dose) and the result of each test is either "pass" or "fail." FIG. 11, described below, shows how 25 such tests give an approximate two dimensional polygon in focus×dose coordinates. This polygon is the process window. The process window of cell $C_{i,j}$ is denoted by $W_{i,j}$. If an actual pair of values [focus, dose] for any cell on a manufactured wafer lies outside of the corresponding process window, this event is called a "process window violation."

In step 906, the systematic component of focus and dose values are measured by a scatterometry method for the entire wafer. This process is shown illustrated in FIGS. 12A and 12B, described below. The techniques involved in scatterometry analysis are generally known to those of skill in the art.

A "covariance kernel" of a stationary Gaussian stochastic process R(x, y) is a function K $(R(x_a, y_a), (x_b, y_b))$ that computes the covariance between values of the process between two points $a=(x_a, y_a)$ and $b=(x_b, y_b)$. This covariance kernel completely defines the stationary Gaussian stochastic process. In step 908, the scatterometry data (from step 906) is used to determine the variance and the covariance kernel of the random Gaussian component R(x, y) of focus and dose values by linear regression. The process for determining the variance and covariance kernel would be apparent to one of skill in the art and thus is not described further herein. This way, in step 910, the values of focus and dose at any given point (x, y) on the wafer for a single lithographical exposure can be represented as a sum of the systematic component S(x, y) (known from step 906) and the Gaussian random component R(x, y) (see, for example, FIG. 13, described below). The covariance kernel will be written in a brief form as K(a; b) for convenience, taking R to be implicit.

Now, when the Gaussian stochastic processes Focus (x, y) and Dose (x, y) are well defined, in step 912, a number of iterations of a Monte Carlo simulation are run to generate a set of values for the Gaussian random component of focus and dose for every one of the cells on each chip. The output of each iteration is thus the number of chips on the wafer for which at each point (x, y) (corresponding to a point within each chip) the values of focus and dose belong to (i.e., fall within) the corresponding process window. The output of the simulation is the arithmetic mean of the outputs for each iteration, i.e., the wafer yield which is the (expected) number of chips on the wafer that have no process window violations.

Simulating (sampling) a Gaussian stochastic process with a given covariance matrix generally takes $O(k^2)$ time, wherein k is the number of points at which the value of the process is computed. The random component of the focus and dose is shift invariant, i.e., it does not depend on what chip on the wafer is chosen. Thus, $$k = \frac{area\_of\_one\_chip}{area\_of\_one\_rectangular\_cell},$$

i.e., k ranges approximately from $1\times10^7$ to $1\times10^8$. In this situation the quadratic runtime is obviously not acceptable.

However, in the case when the covariance matrix is obtained from the covariance kernel a special technique can be used which allows the runtime to be reduced to just O(rk), wherein r is about 20. This technique is described in detail below.

Figure 10:
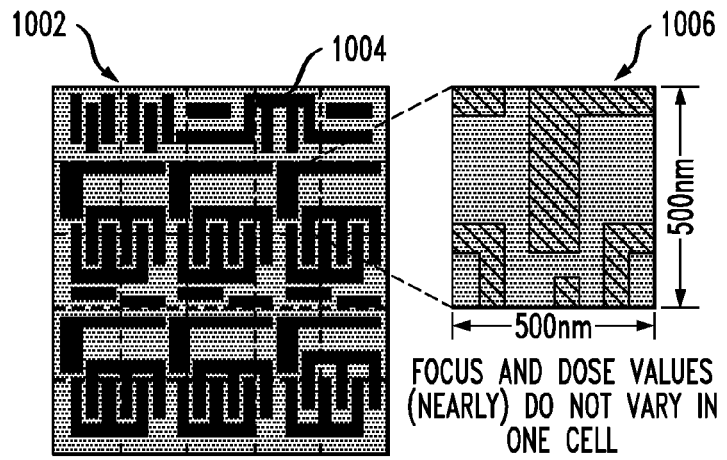
FIG. 10 is a diagram illustrating a chip having been divided into a plurality of rectangular cells according to an embodiment of the present invention.

FIG. 10 is a diagram illustrating an exemplary chip 1002 having been divided into a plurality of rectangular cells 1004. As highlighted above, the rectangular cells are chosen to be small enough such that the value of focus and dose across each cell may be assumed to be constant. A magnified view 1006 of a given one of cells 1004 is also provided in FIG. 10. It can be seen from view 1006 that in this exemplary embodiment each cell 1004 has 500 nm×500 nm dimensions. With this cell size, the mean values of process parameters, such as focus and dose, remain constant from one lithographic exposure to another.

Figure 11:
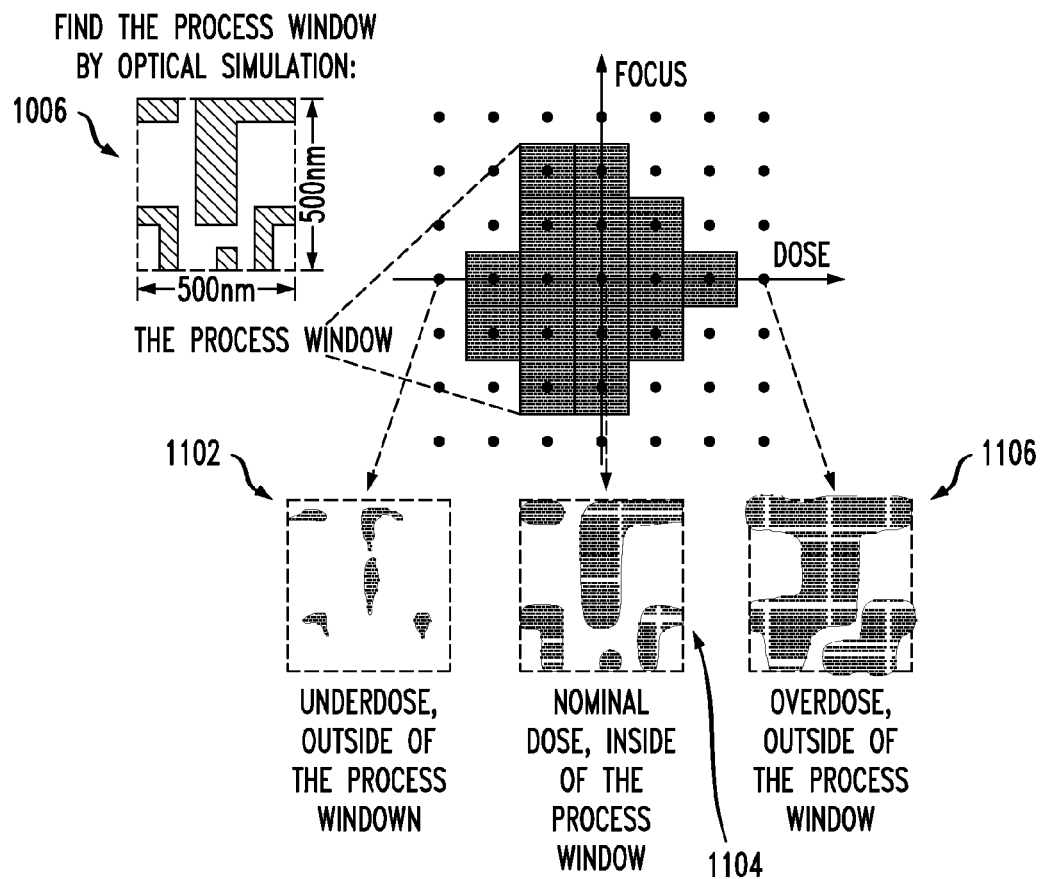
FIG. 11 is a diagram illustrating a process window having been determined for one of the cells of FIG. 10 by running optical simulations for different values of focus and dose according to an embodiment of the present invention.

FIG. 11 is a diagram illustrating a process window having been determined for one of cells 1004 (of FIG. 10) by running optical simulations for different values of focus and dose. According to an exemplary embodiment, the simulations are conducted using a program PROLITH available, e.g., from KLA-Tencor Corporation, Milpitas, Calif. The input to the program is {focus, dose, set of shapes}. The output is the set of shapes as it would be printed on the wafer. The cell shown in FIG. 11 is the same cell shown in magnified view 1006 in FIG. 10, and is thus labeled accordingly.

As shown in FIG. 11, the process window is a function of both dose and focus values. For illustrative purposes, three magnified views 1102, 1104 and 1106 of sample cells (all with the same pattern as the cell in view 1006) are shown, two of which (in views 1102 and 1106) are outside of the process window due to under/over dose, respectively. The third cell (in view 1104) is inside the process window based on a nominal dose, i.e., intended (versus actual) dose.

Figure 12A:
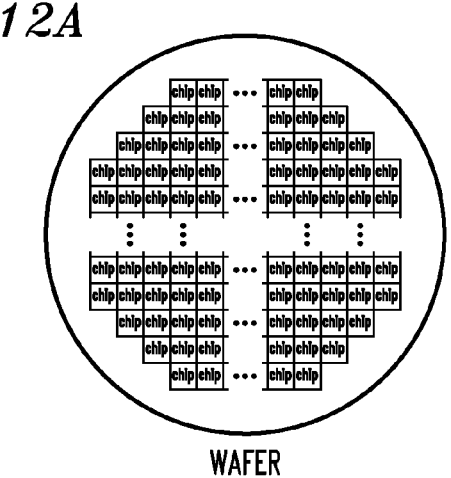
FIGS. 12A and 12B are diagrams illustrating the systematic component of focus and dose being measured by a scatterometry method for a wafer according to an embodiment of the present invention.
Figure 12B:
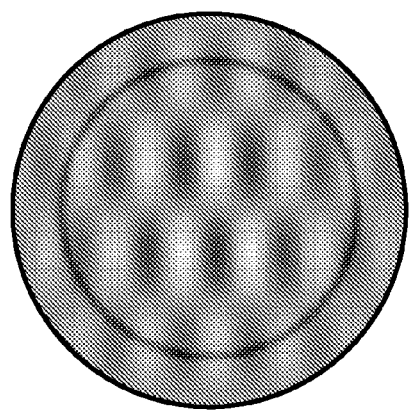
Figure 13:
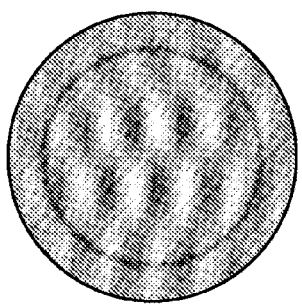
FIG. 13 is a diagram illustrating how focus and dose values at a point on a chip for a single lithographical exposure can be represented as a sum of a systematic component and a random component according to an embodiment of the present invention.
Figure 13:
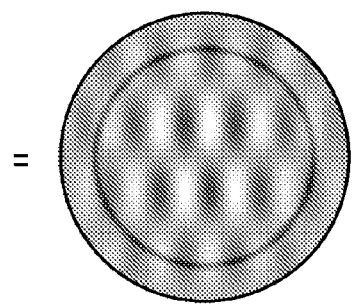
Figure 13:
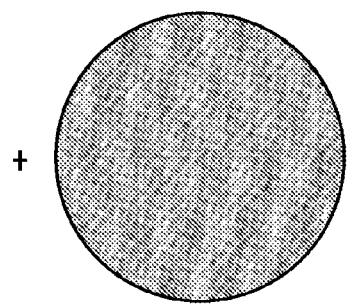

As highlighted above, the next step is to measure the systematic component of focus and dose for the wafer using a scatterometry method. This process is shown illustrated in FIGS. 12A and 12B. Specifically, a subject wafer that includes a plurality of chips is shown in FIG. 12A, and the results of a scatterometry analysis performed on the wafer (of FIG. 12A) are shown in FIG. 12B. The deviation from the focal plane is what is also referred to herein simply as "off focus distance," namely the distance from the wafer surface to the focal plane of the lens (of the scatterometer). Because both the lens and the wafer surface are not perfect, the off focus distance is non-zero. It varies from point to point on the wafer. It is notable that according to the present techniques the measurement by the scatterometry method on real physical equipment needs to be done only once. The shading in FIG. 12B shows the off focus distance and that there is a regular pattern. For example, the gray areas represent an exact match, the white areas represent deviations in a negative direction and the black areas represent deviations in a positive direction. As highlighted above, focus and dose values at a point on a chip, e.g., point (x, y), for a single lithographical exposure can be represented as a sum of a systematic component S(x, y) and a random component R(x, y). This process is shown illustrated in FIG. 13.

What follows is a description of how the systematic component of focus and dose values across a wafer is determined by a scatterometry method. The variation of focus and dose across small regions (of size ~0.1 millimeters (mm)) consists only of the random component (assuming the systematic component to be constant). So the values of focus and dose are modeled as random processes with the mean value equal to that constant value S(x, y) of the systematic component. The latter is determined by a scatterometry method.

The wafer is then divided into a regular grid G, with each grid cell of this size. For a fixed piece of lithography equipment, the values S_focus(x, y) and S_dose(x, y) over these grid cells form two dimensional functions, like the ones shown on FIGS. 14A and 14B.

Figure 14A:
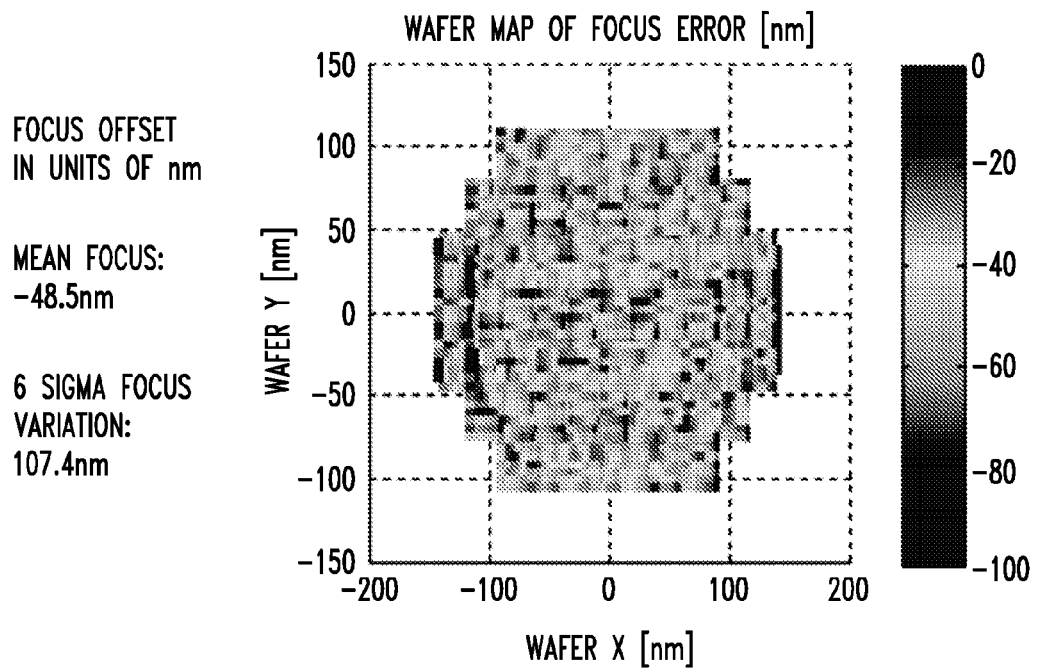
FIGS. 14A and 14B are diagrams illustrating mean values of focus and dose, respectively, across a standard wafer according to an embodiment of the present invention.
Figure 14B:
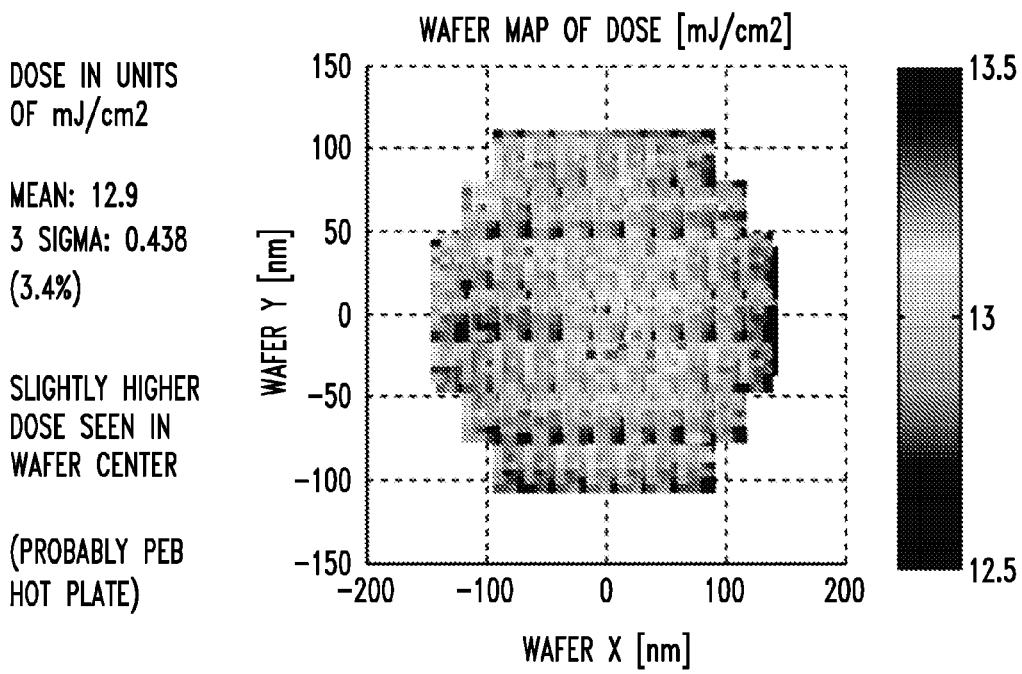

FIGS. 14A and 14B are diagrams illustrating mean values of focus and dose, respectively, across a standard 300 mm wafer measured on IL03 lithography equipment. Specifically, FIG. 14A is a wafer map 1400A of focus error (measured in nm) (with regard to focus, of interest is how far the focal plane of the lens is from the wafer, hence focus error or deviation) and FIG. 14B is a wafer map 1400B of dose (measured in millijoules per square centimeter (mJ/cm²)) (in contrast to focus error, with dose the expected value is known).

FIGS. 14A and 14B contain real experimental data obtained by a scatterometry method. According to an exemplary embodiment, the scatterometry method is performed by first manufacturing a mask for a special Process Monitor Grating design. See, for example, T. A. Brunner et al., "Process Monitor Gratings," Proc. of SPIE, 6518 (2007). The design is purposefully made to be as sensitive as possible to process parameter variations (this is the opposite to what is typically required from real designs, namely robustness to variations in process parameters). The lithography process is then run. Scatterometry is an experimental method of measurement. It gives very precise values for real dose and off focus distance. Basically, given a wafer, a mask, and a piece of lithography equipment, a scatterometry measurement produces graphs (or table of values) like those shown in FIGS. 14A and 14B.

Figure 15:
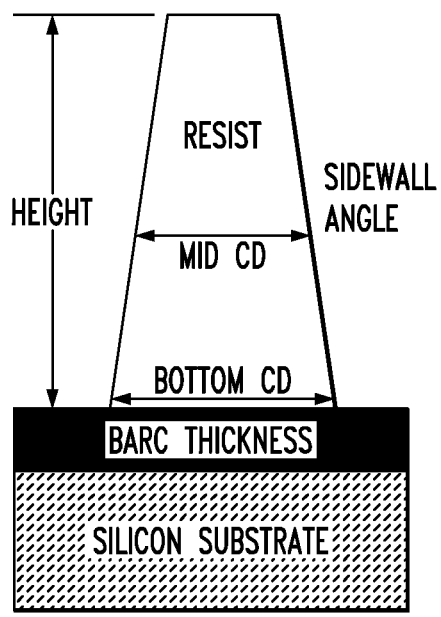
FIG. 15 is a cross-sectional schematic diagram illustrating a single trapezoid scatterometer model of a resist process according to an embodiment of the present invention.

By way of example only, FIG. 15 is a cross-sectional schematic diagram illustrating a single trapezoid scatterometer model of a resist process. FIG. 15 is provided to illustrate how certain characteristics related to the developed resist can be used in the present techniques. Specifically, this single trapezoid model determines four grating parameters as shown in FIG. 15, namely, mid critical dimension (CD) which is dose-sensitive, sidewall angle which is focus sensitive, bottom anti-reflective coating (BARC) thickness and resist height (after development). These characteristics of the developed resist can be measured by shooting light of a certain wavelength and then measuring the spectrum of the response. A bottom critical dimension (CD) parameter may also be determined. The model can be built for a standard resist process, such as 45 nm node technology.

These characteristics of the resist can then be used to determine the mean values of focus and dose for each cell in the grid G, defined over the wafer (i.e., mean values of focus and dose are measured by shooting light, see above). These mean values form two two dimensional functions $S_{focus}(x,y)$ and $S_{dose}(x, y)$ which are required for the complete description of a Gaussian random process (see, for example, the description of FIG. 9, above).

What follows is a description of Fast Monte Carlo sampling by Eigenvalue decomposition of a covariance kernel. With Eigenvalue decomposition of a stochastic process, consider a two dimensional stochastic process R(x, y) over some closed domain D. For example, the random values of the random component of focus over a chip can be such a stochastic process, i.e., the normally distributed random focus component at any location (x, y) on the chip area can be the normally distributed random variable R(x, y).

If K(a; b) is the covariance kernel of R(x, y), where a=($x_a$, $y_a$) and b=($x_b$, $y_b$) are any two points on D, then the orthogonal decomposition of R(x, y) is given by the Karhunen-Loeve expansion:

$$R(x, y) = \sum_{j=1}^{\infty} \sqrt{\lambda_j}\, \xi_j f_j(x, y) \quad (4)$$

where $\lambda_j$ is the j-th largest eigenvalue of the covariance kernel K and $f_j(x, y)$ is the corresponding eigenfunction of K. The eigenpairs ($\lambda_j, f_j$) are solutions of the integral equation $$\int_D K(a,b)f(a)da = \lambda f(b) \quad (5)$$

where $f_j$ are orthonormal. The random variables (RVs) $\xi_j$ are uncorrelated. From Equation 4, it can be seen that the j-th eigenvalue $\lambda_j$ is a measure of the contribution of the j-th RV $\xi_j$ to the overall variance of the process.

The Karhunen-Loeve expansion can be understood as follows. The stochastic process R(x, y) contains an infinitely large number of random variables (RVs), one for each location on the domain D. These RVs may be correlated, as represented by the covariance kernel K. The Karhunen-Loeve expansion provides a new set of RVs ($\xi_j$) that can reproduce all these location-defined RVs, as per Equation 4. However, these new RVs possess two useful properties. First, they are uncorrelated, unlike the original RVs in the process. Second, they are arranged so as to maximally capture the statistical variance of the process in the minimum number of RVs. In other words, the first r terms of the expansion (Equation 4) capture the maximum possible variance of the original process R(x, y) that is captureable by any set of r uncorrelated RVs.

With the eigenvalues $\lambda_j$ arranged in descending order of magnitude, the summation in Equation 4 is truncated to the first r terms, as $$R(x, y) \approx \sum_{j=1}^{r} \sqrt{\lambda_j}\, \xi_j f_j(x, y), \quad (6)$$

where r is small (e.g., 25). This truncation provides a reasonable approximation of the process R, because of the second property listed above. Here, r is chosen using a pre-defined criterion of truncation accuracy. Using this truncation, all the random values R(x, y) for all locations on D can be generated using just r random variables $\xi_1, \ldots, \xi_r$. Hence, the random component of focus and dose across the entire chip can be generated using a total of only 2r random variables.

What follows is a description of computing the eigendecomposition of a covariance kernel. It can now be seen how the eigenpairs ($\lambda_j, f_j(x, y)$) can be computed, using as an example covariance kernel a two dimensional exponential kernel, $$K(a,b) = e^{-C_x|x_a-x_b|-C_y|y_a-y_b|}. \quad (7)$$

See R. Ghanem et al., "Stochastic Finite Elements: a Spectral Approach," Dover, revised edition, pages 27-29 and 148-149 (2003) for detailed derivations of the following mathematical results. If ($L_x$, $L_y$) are the dimensions of the chip, then the eigenpairs of this kernel are given by:

$$\lambda_j^{(1)} = \frac{4c_x c_y}{(\alpha_j^2 + c_x^2)(\beta_j^2 + c_y^2)}, \tag{8}$$

$$f(x,y) = \begin{cases} \dfrac{\cos(\alpha_j x)}{\sqrt{L_x + \dfrac{\sin(2\alpha_j L_x)}{2\alpha_j}}} \dfrac{\cos(\beta_j y)}{\sqrt{L_y + \dfrac{\sin(2\beta_j L_y)}{2\beta_j}}}, & \text{for odd } j \\ \dfrac{\sin(\alpha_j x)}{\sqrt{L_x - \dfrac{\sin(2\alpha_j L_x)}{2\alpha_j}}} \dfrac{\sin(\beta_j y)}{\sqrt{L_y - \dfrac{\sin(2\beta_j L_y)}{2\beta_j}}}, & \text{for odd } j, \end{cases} \tag{9}$$

wherein $\alpha_j$ is the solution of the following equations, $$c_x - \alpha_j \tan(L_x \alpha_j) = 0 \text{ for odd } j, \text{ and } \alpha_j + c_x \tan(L_x \alpha_j) = 0 \text{ for even } j, \tag{10}$$

and $\beta_j$ is the solution of the same equations, but with $c_x$ replaced by $c_y$, and $L_x$ replaced by $L_y$.

What follows is a description of Fast Monte Carlo simulation using a reduced number of uncorrelated random variables. The random component of the focus value at any location (x, y) on the chip is given by Equation 6. The eigenpairs ($\lambda_j$, $f_j(x, y)$) for j=1, . . . , r for a given manufacturing process are pre-computed. The wafer yield is the expected number of chips on the wafer that have no process window violations. This yield can be estimated using Monte Carlo simulation. In each iteration of the simulation, a set of values is generated for the random component of the focus and dose for every cell on one chip. This set of random values for focus or dose is called a sample. As highlighted above, the values of focus and dose at point (x, y) for a single lithographical exposure can be represented as a sum of the systematic component S(x,y) and the Gaussian random component R(x, y). For various positions of the chip on the wafer, a check is made for process window violations. In this way the number of chips on a single wafer that have no process window violations for this sample can be counted. This process is repeated for several samples and finally the arithmetic mean is taken of the number of violation-free chips from each iteration. This arithmetic mean is the estimate of the yield. Normally, if there are k cells on the chip, k random values of the random component of focus would need to be generated using a random number generator and impose a k×k covariance matrix, for each sample. This operation has a computational cost that is proportional to $k^2$, and is, hence, prohibitively expensive for the usual large values of k. However, with Equation 6, only r random values $\xi_1$, . . . , $\xi_r$, need to be generated, that are uncorrelated, and then the random component of focus at every cell using Equation 6 can be computed. Now, the computational cost is proportional to only rk, where r is much smaller than k. This can be thousands to millions of times faster than the previous method. The same arguments apply to the case of the random component of dose.

Figure 16:
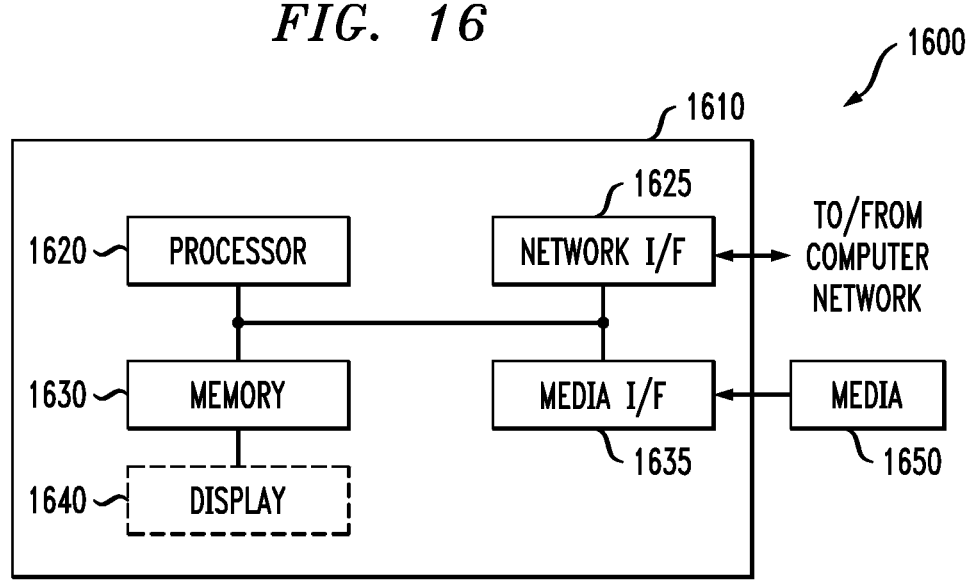
FIG. 16 is a diagram illustrating an exemplary system for implementing one or more of the methodologies presented herein according to an embodiment of the present invention.

Turning now to FIG. 16, a block diagram is shown of an apparatus 1600 for implementing one or more of the methodologies presented herein. By way of example only, apparatus 1600 can be configured to implement one or more of the steps of methodology 100 of FIG. 1 for determining a probability of failure of a VLSI query design and/or methodology 900 of FIG. 9 for estimating yield of a wafer having a plurality of chips of a given design printed thereon.

Apparatus 1600 comprises a computer system 1610 and removable media 1650. Computer system 1610 comprises a processor device 1620, a network interface 1625, a memory 1630, a media interface 1635 and an optional display 1640. Network interface 1625 allows computer system 1610 to connect to a network, while media interface 1635 allows computer system 1610 to interact with media, such as a hard drive or removable media 1650.

As is known in the art, the methods and apparatus discussed herein may be distributed as an article of manufacture that itself comprises a machine-readable medium containing one or more programs which when executed implement embodiments of the present invention. For instance, when apparatus 1600 is configured to implement one or more of the steps of methodology 100 the machine-readable medium may contain a program configured to build a Voronoi diagram comprising a set of shapes that represent the design, wherein each edge of a given one of the shapes represents a separate Voronoi cell in the Voronoi diagram; convert the Voronoi diagram into a rectangular grid comprising $2^t \times 2^s$ rectangular cells, wherein t and s are chosen so that one rectangular cell contains from about one to about five Voronoi cells; compute a probability of failure for each of the cells in the grid; pairwise merge the cells in the grid; recompute a probability of failure for the merged cells which accounts for a spatial correlation between the cells; and perform the pairwise merge and recompute steps s+t times to determine the probability of failure of the design.

When apparatus 1600 is configured to implement one or more of the steps of methodology 900, the machine-readable medium may contain a program configured to divide the chip design into a plurality of rectangular cells, wherein each of the cells is chosen to be small enough such that focus and dose values across the cell can be assumed to be constant; determine a process window for each of the cells; measure the focus and dose values on the wafer; use the measured focus and dose values to determine a Gaussian random component of the focus and dose values; represent the focus and dose values on the wafer as a sum of a systematic component of the focus and dose values and the Gaussian random component of the focus and dose values; and estimate wafer yield based on a number of the chips on the wafer for which at each point (x, y) the focus and dose values, as represented as the sum of the systematic component of the focus and dose values and the Gaussian random component of the focus and dose values, belong to a corresponding one of the process windows.

The machine-readable medium may be a recordable medium (e.g., floppy disks, hard drive, optical disks such as removable media 1650, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 1620 can be configured to implement the methods, steps, and functions disclosed herein. The memory 1630 could be distributed or local and the processor device 1620 could be distributed or singular. The memory 1630 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1620. With this definition, information on a network, accessible through network interface 1625, is still within memory 1630 because the processor device 1620 can retrieve the information from the network. It should be noted that each distributed processor that makes up processor device 1620 generally contains its own addressable memory space. It should also be noted that some or all of computer system 1610 can be incorporated into an application-specific or general-use integrated circuit.

Optional video display 1640 is any type of video display suitable for interacting with a human user of apparatus 1600. Generally, video display 1640 is a computer monitor or other similar video display.

Although illustrative embodiments of the present invention have been described herein, it is to be understood that the invention is not limited to those precise embodiments, and that various other changes and modifications may be made by one skilled in the art without departing from the scope of the invention. The contents of each of the references mentioned above are hereby incorporated by reference herein.

What is claimed is:

1. A method for estimating yield of a wafer having a plurality of chips of a given design printed thereon, the method comprising the steps of:
   dividing the chip design into a plurality of rectangular cells, wherein each of the cells is chosen to be small enough such that focus and dose values across the cell can be assumed to be constant;
   determining a process window for each of the cells;
   measuring the focus and dose values on the wafer;
   using the measured focus and dose values to determine a Gaussian random component of the focus and dose values;
   representing the focus and dose values on the wafer as a sum of a systematic component of the focus and dose values and the Gaussian random component of the focus and dose values; and
   estimating wafer yield based on a number of the chips on the wafer for which at each point (x, y) the focus and dose values, as represented as the sum of the systematic component of the focus and dose values and the Gaussian random component of the focus and dose values, belong to a corresponding one of the process windows.

2. The method of claim 1, further comprising the step of:
   generating a set of values for the Gaussian random component of the focus and dose values using Monte Carlo simulation.

3. The method of claim 1, wherein the chip design comprises a set of shapes.

4. The method of claim 1, wherein the step of determining the process window further comprises the step of:
   running optical simulations for different focus and dose values for each of the cells.

5. An article of manufacture for estimating yield of a wafer having a plurality of chips of a given design printed thereon, comprising a non-transitory machine-readable medium containing one or more programs which when executed implement the steps of the method according to claim 1.

6. An apparatus for estimating yield of a wafer having a plurality of chips of a given design printed thereon, the apparatus comprising:
   a memory; and
   at least one processor device, coupled to the memory, operative to:
      divide the chip design into a plurality of rectangular cells, wherein each of the cells is chosen to be small enough such that focus and dose values across the cell can be assumed to be constant;
      determine a process window for each of the cells;
      measure the focus and dose values on the wafer;
      use the measured focus and dose values to determine a Gaussian random component of the focus and dose values;
      represent the focus and dose values on the wafer as a sum of a systematic component of the focus and dose values and the Gaussian random component of the focus and dose values; and
      estimate wafer yield based on a number of the chips on the wafer for which at each point (x, y) the focus and dose values, as represented as the sum of the systematic component of the focus and dose values and the Gaussian random component of the focus and dose values, belong to a corresponding one of the process windows.

* * * * *